H. W. KING.
Howeling, Crozing, and Chamfering Machines.
No. 221,172.  Patented Nov. 4, 1879.
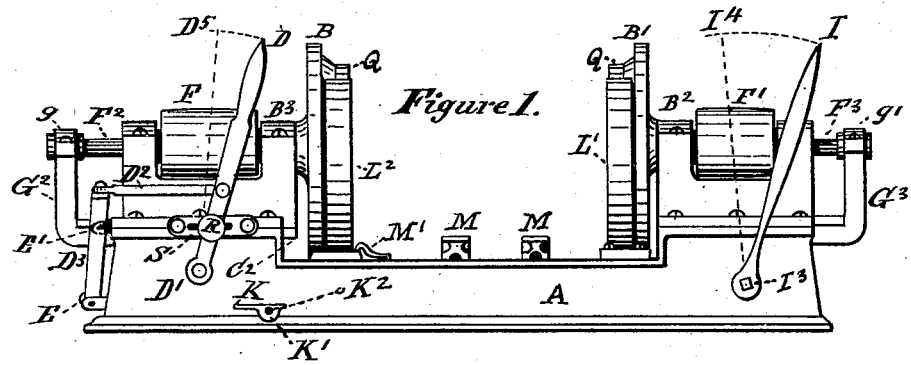
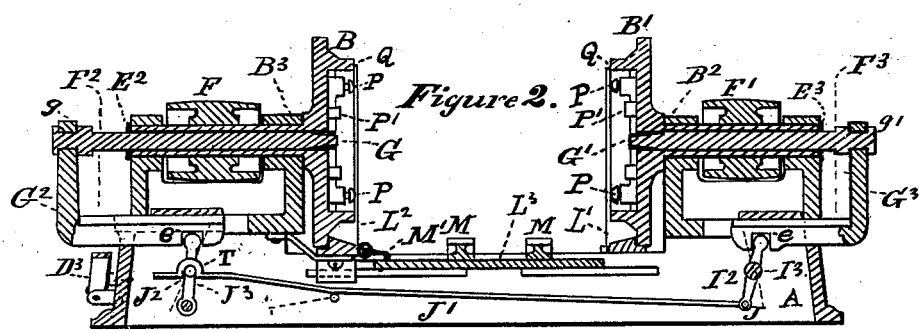
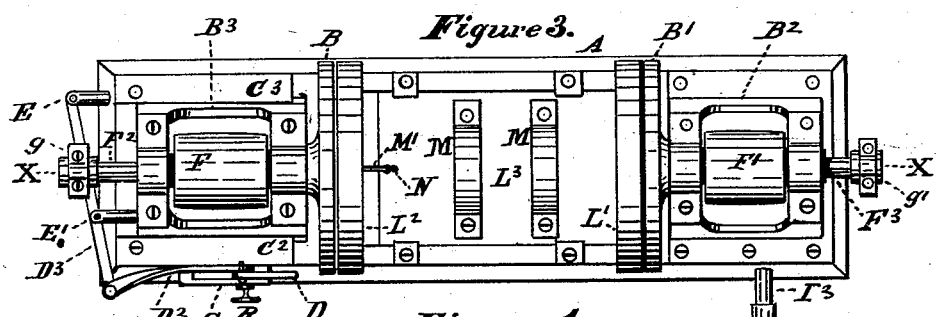
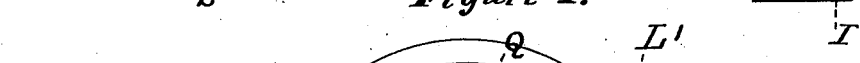
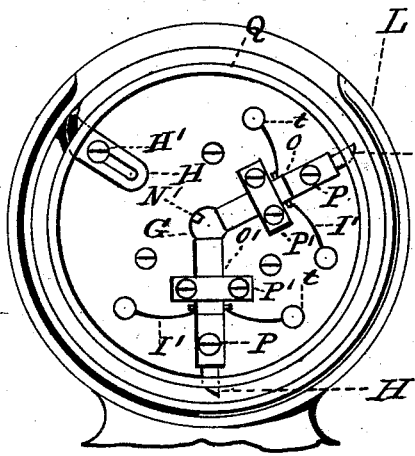
Witnesses
Inventor:
Horace W. King.

UNITED STATES PATENT OFFICE.

HORACE W. KING, OF ALDEN, NEW YORK.

IMPROVEMENT IN HOWELING, CROZING, AND CHAMFERING MACHINES.

Specification forming part of Letters Patent No. 221,172, dated November 4, 1879; application filed February 20, 1879.

*To all whom it may concern:*

Be it known that I, HORACE W. KING, of Alden, in the county of Erie and State of New York, have invented certain new and useful Improvements in Howeling, Crozing, and Chamfering Machines, which improvements are fully set forth in the following specification and accompanying drawings; in which—

Figure 1 represents a side elevation; Fig. 2, a vertical longitudinal section through lines X X, Fig. 3, through the cutter-heads, shafts, pulleys, and frames, and a section through a portion of the sliding bars for moving the cutter-cams. Fig. 3 is a plan view; and Fig. 4 represents a front view of one of the cutter-heads.

This invention relates to certain improvements in the mechanism for regulating the action of the cutters, either in one of the cutter-heads alone, or both together; and also the means for receiving, holding, and releasing the barrel, which remains stationary while being operated upon, as will be more clearly hereinafter shown by reference to the drawings, in which—

A is the frame of the machine, upon which are supported the revolving cutter-heads B B' in the frames $B^2$ $B^3$.

The cutter-head frame $B^2$ is held rigidly attached to the frame A, and $B^3$ is arranged so as to slide, or be moved back and forth, in the slideways $C^2$ $C^3$ by means of the hand-lever D, which is jointed to the frame A at D', and connected by an arm, $D^2$, to the arm $D^3$, also jointed to the frame A at E, and to the cutter-head frame $B^3$ at E'. (See Figs. 1 and 3.)

It will be seen that a movement of the hand-lever backward or forward will give to the frame $B^3$ the necessary movements, either backward or forward.

The cutter-heads are fastened to hollow mandrels $E^2$ $E^3$, arranged to revolve in boxes in the frames $B^2$ $B^3$, and are driven by means of belts and the pulleys F F'.

$F^2$ $F^3$ are mandrels having the wedge-shaped cutter-cams at the ends G G', and connected to the sliding bars $G^2$ $G^3$, so as to hold them securely, and at the same time allow them to turn easily, as shown in Figs. 1, 2, and 3, at $g$ $g'$.

H is the chamfering-cutter, which is slotted, so as to be adjustable, and fastened in place by a screw, H'. (See Fig. 4.)

$H^2$ represents the howeling-cutter, the office of which is to prepare the surface for crozing, and $H^3$ is the crozing-cutter.

$H^2$ and $H^3$ are shown as arranged at an angle to each other; but they may be placed directly opposite, and the operation of the cams for moving them outward would be the same.

The mandrels $F^2$ $F^3$ are made to move horizontally to or from each other by the hand-lever I, Figs. 1 and 3, and are made in the form of wedge-shaped cams G G' at the ends, so that a forward movement will force the cutters $H^2$ $H^3$ outward away from each other, and an opposite movement will allow the springs I' to force or move them back again. The cams for operating the cutters on both cutter-heads are moved at the same time by the one hand-lever I by means of the vibrating arm $I^2$ connected to the shaft $I^3$, to which is jointed at J a connecting-rod, J', (see Fig. 2,) arranged so as to be easily connected or disconnected to or from the pin $J^2$ on the rocking arm $J^3$.

When it is necessary to operate the cutters on one head only, a pressure on the foot-step K, which is jointed to the frame A at K', (shown in Fig. 1,) will raise the opposite end of an arm, $K^2$, on the inside of the frame A (shown by dotted lines) upward, so as to lift the connecting-rod J' up high enough to disengage it from the pin $J^2$, (see Fig. 2,) thereby allowing only the cutters in the head B' to be operated. A release of the foot-step K will permit the connecting-rod J' to connect by its own weight with the pin $J^2$ again.

The upper ends of the arms $I^2$ $J^3$ fit into openings $e$ in the bottom of the sliding bars $G^2$ $G^3$, as shown in Fig. 2.

L' represents a stationary barrel-holding rim, rigidly fastened to the frame A, and $L^2$ is a similar rim, fastened to the movable cutter-head frame $B^3$, and moves with it.

$L^3$ represents a platform, having curved ordinary barrel-supports M. It is connected to the movable frame $B^3$ by a hook, M', which is jointed to said frame, and catches into a hole, N, in the platform, so that it will move with the frame $B^3$, or be easily released therefrom if required. (See Figs. 1, 2, and 3.)

The cam-mandrels $F^2$ $F^3$ are made to revolve with the cutter-heads by means of a feather and keyway, N'. (Shown in Fig. 4.)

The cutters $H^2$ $H^3$ are fastened in sockets in the sliding bars O O' by means of set-screws P, so as to be easily removable when necessary, and the bars O O' are secured in position so as to move easily by the cross-bars P', and the tools or cutters, which pass through openings in the rim Q.

The hand-lever D is kept in place by a slotted bar, S, and a set-screw, R, for fastening it at any point desired.

The operation of the machine is as follows: The cutter-head and frame B $B^3$ being moved back, the barrel is placed on the supports M, and by moving the hand-lever D from $D^5$ to D, the ends are forced into the rims L' $L^2$, where it is held stationary until finished by the cutters, which are moved forward the necessary distance for cutting, by moving the hand-lever I from I to $I^4$, and then (after the barrel is finished) it is moved back again in the manner hereinbefore mentioned. By reversing the movement of the hand-lever D, the barrel may be taken out.

In operating the sliding cutter-head frame $B^3$ by lever D, for the purpose of holding or releasing the barrel, the outer end of the foot-step K should be pressed down, so as to lift the hook-shaped portion T of the rod J' from the pin $J^2$, and released again when the barrel is in position, so that both cutter-heads and cutters may be used as before mentioned.

One of the advantages of this machine is, that it is not necessary to stop the cutter-heads from running while putting in or taking out a barrel, and the work done is similar and equal to hand-work.

I claim as my invention—

1. The combination of the platform, its movable supports M M, revolving heads B B', carrying-cutters, and catch-hook M', carried by the frame of the sliding head, substantially as set forth.

2. The combination, with the heads B B', their cutters, and sliding cams G G', of the connecting-rod J, and devices for throwing the same out of connection, as set forth.

HORACE W. KING.

Witnesses:
 DANL. H. BURTIS,
 JAMES SANGSTER.